United States Patent [19]
Hauser

[11] 3,955,953
[45] May 11, 1976

[54] METHODS OF MAKING SELF FILTERING NOZZLES

[75] Inventor: Anthony J. Hauser, Stone Park, Ill.

[73] Assignee: Teletype Corporation, Skokie, Ill.

[22] Filed: July 31, 1974

[21] Appl. No.: 493,449

[52] U.S. Cl. .................................. 65/18; 65/61; 65/108; 210/460
[51] Int. Cl.² .................. C03B 23/20; C03B 19/00; C03B 21/00; B01D 23/00
[58] Field of Search ................... 65/18, 61, 108; 210/460

[56] References Cited
UNITED STATES PATENTS

| | | | |
|---|---|---|---|
| 1,669,362 | 5/1928 | Watson | 65/18 X |
| 2,114,748 | 4/1938 | Prausnitz | 65/18 X |
| 2,136,170 | 11/1938 | Luertzing | 65/18 X |
| 2,149,133 | 2/1938 | Cohn | 210/460 X |
| 2,925,370 | 2/1960 | Rohrer | 65/61 X |
| 3,393,988 | 7/1968 | Blumenthal | 65/61 |
| 3,414,394 | 12/1968 | Poad | 65/18 |

Primary Examiner—S. Leon Bashore
Assistant Examiner—Frank W. Miga
Attorney, Agent, or Firm—W. G. Dosse; J. L. Landis

[57] ABSTRACT

One end of a glass tube is packed with glass powder of a predetermined size. The combination is then sintered to produce a filter within the tube. The resultant tube and filter are thoroughly washed in the direction toward the other end of the tube. The other end of the glass tube is melted to form a restriction to the flow fluid. The other end of the tube is then ground down until a microscopic orifice appears. The resultant structure is a self filtering nozzle of an exceedingly small diameter with a very low propensity to clog.

5 Claims, 5 Drawing Figures

U.S. Patent  May 11, 1976  3,955,953
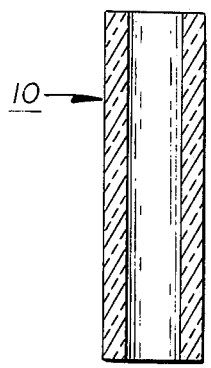
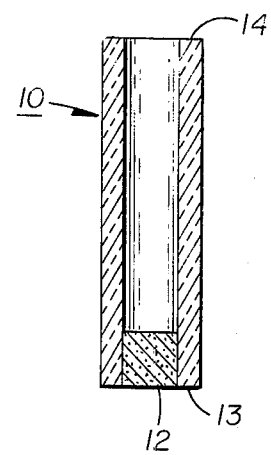
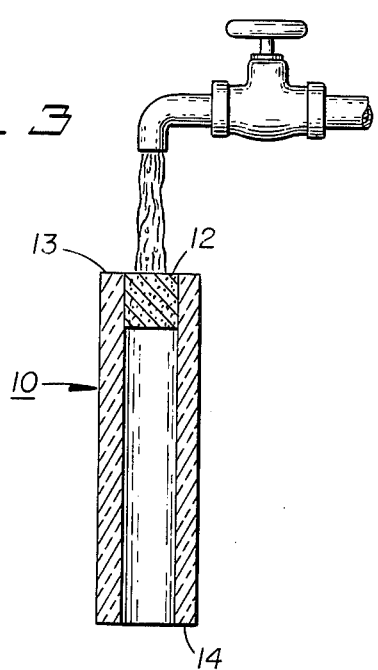
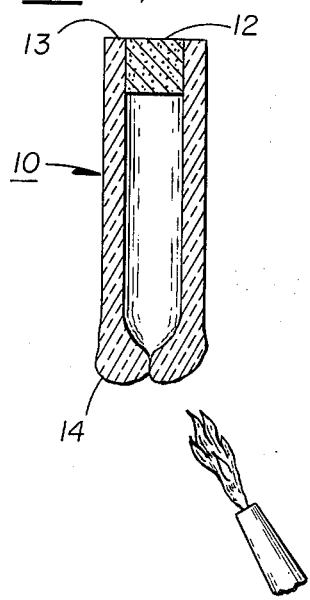
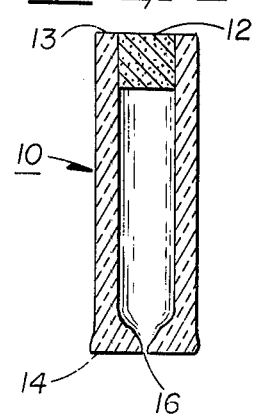

METHODS OF MAKING SELF FILTERING NOZZLES

FIELD OF THE INVENTION

The present invention relates to nozzle manufacture and more particularly to manufacture of nozzles with integral filters to prevent the clogging of the nozzle in use.

BACKGROUND OF THE INVENTION

In ink jet printers of the type shown in U.S. Pat. No. 3,500,436 granted on Mar. 10, 1970, to R. W. Nordin, pressurized ink on the order of approximately 20 to over 100 psi is delivered to nozzles on the order of 0.001-inch or less in orifice diameter in order to print indicia on paper. Any particle of dust trapped in the fluid ink will clog such a nozzle. The provision of suitably clean and filtered ink has heretofore been exceedingly difficult and unreliable.

U.S. Pat. No. 3,393,988 granted on July 23, 1968, to J. Blumenthal shows a method of forming a minature nozzle from a glass tube by heating one end of the tube until the annular portion converges and essentially blocks the entire central passage through the tube. The heated end, after cooling, is ground until a microscopic orifice is opened, thereby forming a very small nozzle for an ink jet printer.

It has been found that no matter how much a nozzle is washed and no matter what filter is used and fastened to the input of the nozzle, the nozzle still has a high statistical likelihood of clogging due to the ingress of particles after cleaning or during assembly of the nozzle and the filter. This greatly increases the amount of scrap, increases manufacturing complexity with resultant drastic increase in cost of manufacture of nozzles for ink jet printers.

The process of making filters using sintered ground glass or frit is well-known in the prior art and is mentioned as being current practice in the Sept. 12, 1963, issue of *Machine Design* magazine on page 184. In this process ground particles of glass are formed and may be divided by common screening technique into various grit sizes and can be used to produce porous glass filters.

The ground and screened particles are mixed with a liquid vehicle or binder and are pressed to the desired shape. After the vehicle is dried, the part is heated until the glass particles soften and fuse together. If a porous material is desired, the firing is carried out only to the point where the particles start to fuse. The resulting product is a network of pores classified by the maximum pore diameter which is controllable down to very small sizes.

It is an object of the present invention to produce a nozzle which has a high propensity to remain open and unclogged in spite of the possible presence of particles larger than the diameter of the orifice.

It is another object of the present invention to filter out all of the particles of a size larger than the diameter of the orifice of the nozzle prior to delivery of the particles to the nozzle orifice.

It is a further object of the present invention to provide methods of making a combined nozzle and filter with a high likelihood of cleanliness and absence of large diameter particles between the filter and the nozzle.

SUMMARY OF THE INVENTION

With the foregoing and other objects in view, a method of making an integral nozzle and sintered particulate filter in accordance with certain features of the invention includes packing sinterable particulate material into a tube having two ends, and then sintering the particulate material to form a porous, unitary filter within the tube. Thereafter, a nozzle is formed at one end of the tube having an orifice larger in diameter than the pore size of the sintered unitary filter.

Preferably, the filter is formed at one end of the tube and the nozzle at the other, and the filter is washed thoroughly in the direction of the anticipated fluid flow through the filter prior to forming the nozzle orifice at the other end of the tube thereby assuring absence of particles between the filter and the nozzle of a size larger than the diameter of the nozzle orifice.

BRIEF DESCRIPTION OF THE DRAWINGS

A more complete understanding of the present invention may be had by referring to the following detailed description when considered in conjunction with the accompanying drawings wherein like reference numbers indicate similar parts throughout several views in which:

FIG. 1 shows a glass tube at the first stage of the manufacturing process;

FIG. 2 shows the glass tube with ground glass particles packed at one end thereof;

FIG. 3 shows the washing of the glass tube;

FIG. 4 shows melting one end of the glass tube; and

FIG. 5 shows the glass tube after the one end has been ground sufficiently to expose an orifice of the desired diameter.

DETAILED DESCRIPTION

Referring now to the abovementioned drawings and more particularly to FIG. 1, in fabricating nozzles with integral filters in accordance with the present invention, a piece of quarter-inch-diameter glass tubing 10 is cut to approximately seven-eighths of an inch in length and the ends are ground parallel and perpendicular to the axis of the tubing. The glass tube is preferrably made of a thermal-shock-resistant borosilicate glass having a softening point of about 820°C. and a working point of approximately 1245°C, such as that marketed by Corning Glass Works of Corning, N. Y., under the trademark "PYREX" and the composition designation of 7740 for general purpose laboratory glass tubing. However, the preference for type of glass is only to facilitate easy working with high temperatures. If care is exercised to avoid excessive thermal shock, even simple soda lime glass can readily be used.

Referring now to FIG. 2, ground glass, preferably of a formulation identical with the material of the abovementioned tubing, is graded through a conventional screen of approximately 270 mesh per inch. The glass particles or grit that pass through the 270 mesh screen are then graded with a 325 mesh per inch screen. The particles passing through the 325 mesh screen are discarded. The only particles used are those that will pass through the 270 mesh but not the 325 mesh. Alternatively, liquid suspension and settling techniques can be used to obtain glass particles of the desired size. The glass particles are then cleansed of contaminants.

The clean ground glass thus obtained between 270 grit and 325 grit is poured dry in approximately a oneeighth inch layer 12 at one end 13 of the tubing 10. The tube is then shaken or tamped lightly to cause the ground glass to settle in place. A drop of a conventional glass-sintering binder or suspension vehicle such, as the Suspension Vehicle, marketed by Corning Glass Works of Corning, N. Y., is then added to the ground glass. The ground glass is then tamped, using approximately 90 pounds of packing force on a ram. However, the magnitude of the packing force does not seem to be critical.

The binder is then dried. After the binder has been dried, the tube is cleaned to remove any spurious particles. Once cleaned, the packed tubing section is suspended vertically with the packed end 13 exposed in a furnace and sintered at approximately 740°C for approximately 40 minutes. This sintering operation melts the packed ground glass at the boundaries of each particle so as to cause the particles to fuse at their contact points, thereby forming a structure which is porous, yet unitary, and which also fuses to the walls of the tube. The ground glass — or frit as it is sometimes called — is preferrably of the tube material so as to avoid thermal expansion problems when working at various temperatures. However, many techniques are known to the glass industry for accommodating different thermal expansion rates or for using different materials having similar thermal expansion rates.

The filters are then tested for porosity using the well-known bubble point method. Filters with too small a pore size are discarded as they will not pass a sufficient volume of fluid with a sufficiently low pressure drop. Filters with too large a pore size are also discarded since they will pass particles large enough to clog the nozzle orifice with which the filter is ultimately to be used.

Further, the filters are tested for actual flow rate to determine that they will pass sufficient fluid without an excessive amount of pressure drop.

The retained filters that pass both the bubble point test and the flow test are washed thoroughly on the inside with a brush and a pulsating, flowing wash liquid.

After washing, the filters are flushed with water in the direction shown in FIG. 3. A sintered filter is flushed with approximately 200 milliliters of water.

The tubing and filter combination is then dried and suspended, as shown in FIG. 4, with the end 14 down. It is important that the tube is extended with its axis in a vertical plum line. The end 14 is then heated in a tiny furnace, or with a ring of flame, to approximately 1235°C. for approximately 2½ minutes in order to melt the end 14 of the tube in a symmetrical fashion so as to cause it to fuse together as shown in FIG. 4. The tubing is then lapped at the end 14 until an orifice of the desired diameter, shown as 16 in FIG. 5, is exposed by the grinding operation. The end 13 can then be ground, if desired, to achieve a predetermined overall length.

Although only one specific embodiment of the invention is shown in the drawing and described in the foregoing specification, it will be understood that invention is not limited to the specific embodiment described, but is capable of modification and rearrangement and substitution of parts and elements without departing from the spirit of the invention.

What is claimed is:

1. A method of making an integral nozzle and sintered particulate filter, within a tube having two ends, comprising the steps of:

packing sinterable particulate material into the tube;

sintering the particulate material to form a porous, unitary filter within the tube; and thereafter forming a nozzle at one end of the tube having an orifice larger in diameter than the pore size of the sintered unitary filter.

2. A method according to claim 1 further including the step of washing the tube and sintered particulate matter after the sintering step and before the forming step.

3. A method according to claim 1 wherein the forming step is performed by heating the one end of the tube sufficiently to induce the tube material to converge and close the one end of the tube, and machining the closed end of the tube to form the orifice.

4. A method according to claim 1, wherein the particulate material is packed at a location remote from the one end of the tube.

5. A method according to claim 4 wherein the particulate matter is packed at the other end of the tube.

* * * * *